July 19, 1949.　　　　　J. A. HANLEY　　　　　2,476,600
SMALL ELECTRIC MOTOR
Filed Feb. 5, 1946
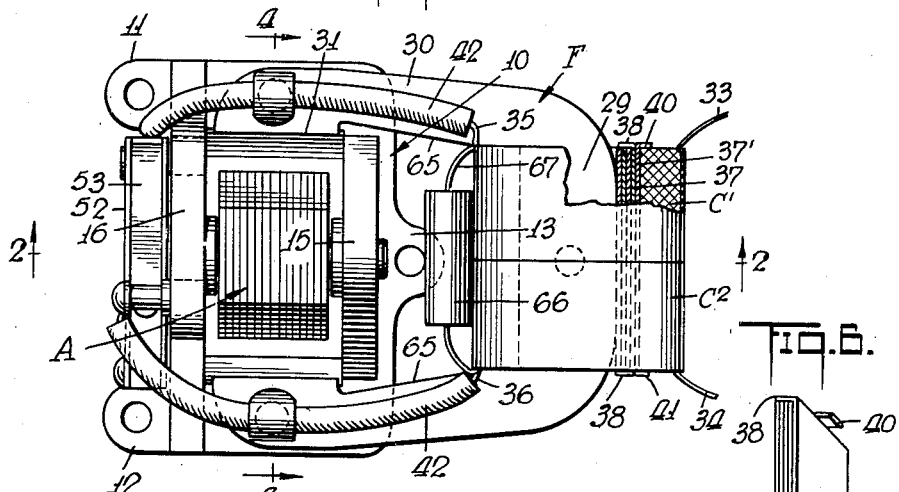
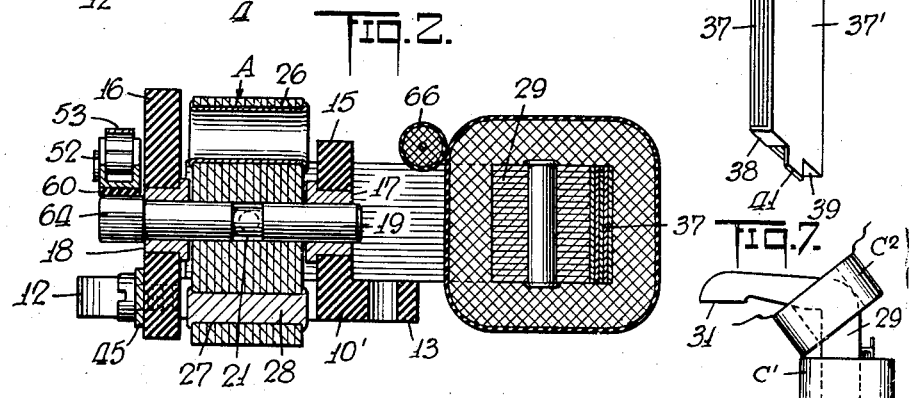
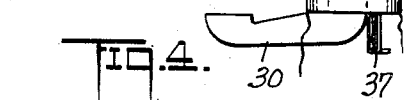
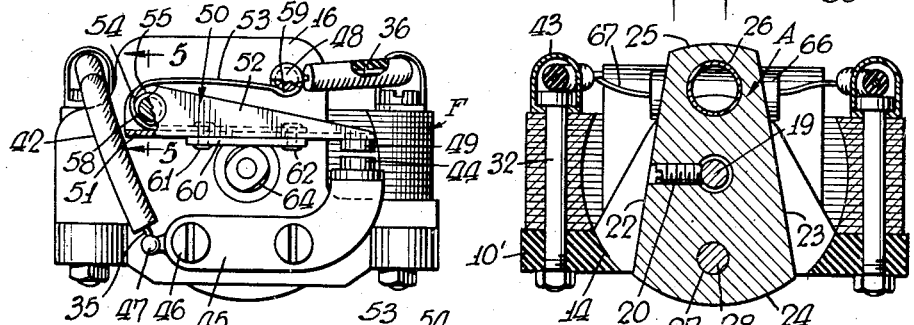
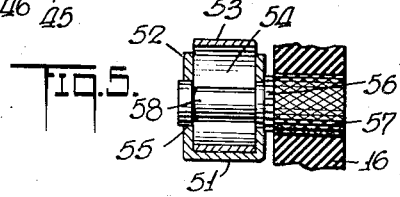
INVENTOR
John A. Hanley
BY
Dean Fairbank & Hirsch
ATTORNEYS Patented July 19, 1949

2,476,600

UNITED STATES PATENT OFFICE 2,476,600

SMALL ELECTRIC MOTOR

John A. Hanley, Noroton, Conn.

Application February 5, 1946, Serial No. 645,647

12 Claims. (Cl. 172—36)

The present invention is concerned with small electric motors, more especially of the universal unwound armature type, that may be operated either by direct or alternating current and in one specific application is concerned with motors to produce a vibratory effect, that is, with motors of the type employed in connection with massaging, brushing or like apparatus.

It is among the objects of the invention to provide a motor of the above type which shall comprise a minimum number of parts of rugged and compact construction having relatively low cost and which shall be easy to assemble, inherently to maintain the various constituent parts thereof in accurate position so as to develop no binding or undue wear, which admits of the use and ready assembly of prewound field coils and obviates the necessity of winding the coils in situ about the horseshoe magnet, in which the movable field circuit interrupter contact arm may be readily applied and removed without the need for tools and with assurance of accurate and secure assembly, and in the vibrator embodiment of which motor the magnitude of vibration may be readily predetermined in accordance with requirements.

In the accompanying drawings in which is shown one of various possible embodiments of the several features of the invention, Fig. 1 is a plan view of one embodiment of the motor, Fig. 2 is a view in transverse cross section, taken on line 2—2 of Fig. 1, Fig. 3 is an end view from the left of Fig. 2.

Fig. 4 is a transverse sectional view taken on line 4—4 of Fig. 1,

Fig. 5 is a transverse sectional detail view taken on line 5—5 of Fig. 3,

Fig. 6 is a perspective view of the laminations for anchoring the field coils, and Fig. 7 is a diagrammatic view on a smaller scale showing the mode of assembly of the field coils upon the field magnet.

Referring now to the drawings, the electric motor comprises a frame 10 desirably of insulating material, fashioned as a unitary piece in an appropriate mold. The frame comprises a generally rectangular open base plate 10' preferably with ears 11 and 12 at the left end, as viewed in Fig. 1, and a median ear 13 at the right end, perforated as shown for facility in mounting the motor. The rectangular opening through the frame has an arcuate bevel 14 at each of its shorter sides conformed to the periphery of the armature A hereafter described. Rising from the sides of the open frame are standards 15 and 16 which accommodate said armature. To this end the standards have bearing bushings 17 and 18, and the armature axle 19 passed through the armature revolves in said bushings. The armature, which is built up of laminations of soft iron, is secured to the axle by a counter sunk set screw 20 pressing into a median peripheral groove 21 in the axle.

For use in association with a hand guided massaging or brushing apparatus, the armature is desirably assymetrical or unbalanced to afford the vibrations desired. To this end the armature is cylindrical in form in which segments have been removed along chords 22 and 23, desirably of equal length that are inclined with respect to each other and symmetrically of a diameter of the cylinder. Thus as best shown at Fig. 4, the armature in cross section presents the appearance of an isosceles trapezoid, the bases of which are arcs of a circle, one of which at 24 is longer and the other 25 is shorter. The armature laminations are secured by an iron rivet as at 28 on the heavy side and by a tubular rivet 26 on the opposite side. Rivet 28 may be a lead plug if desired, depending upon the degree of unbalance and magnitude of vibration required.

The field of the motor desirably comprises a laminated horseshoe magnet structure F having a cross bar 29 and legs 30 that terminate in pole pieces 31 conforming to the periphery of the armature A, and affixed to the base by bolts 32 through aligned apertures in the pole pieces and the base, all as best shown in Fig. 4.

About the cross bar of the field extend the field coil, preferably in two units $C'$ and $C^2$ symmetrically wound with their connections or leads 33 and 34 to the outlet box (not shown) and with leads 35 and 36 to the circuit interrupter to be hereinafter described.

According to the invention, the coils are prewound on mandrels or cores of width sufficiently larger than those of the legs and cross bar of the horseshoe magnet to permit ready introduction of the legs 30 through the coils and passing the latter into position.

To take up the substantial space thus left between the cross bar of the horseshoe magnet and the opening or core of the coils, appropriate means is introduced therebetween, firmly to retain the coils in place on the magnet. Preferably such means is of magnetic material, desirably of laminations 37 similar to those of the horseshoe magnet itself and these laminations preferably fill substantially the entire space between the magnet and the coils and thereby minimize the leakage of magnetic flux. Preferably the laminations are generally rectangular, to correspond to the overall length and width of the coil core or opening. The extreme or outer laminations 37' is, however, of length greater than the companion laminations and has outturned tongues 38 and 39 which extend across the end thicknesses of the companion laminations and thereby maintain the latter in position. The intermediate tongue 40 of the outer or longer lamination is folded upward, as shown, to serve as a stop against the outer end face of coil C' and after assembly, as shown in Fig. 1, the opposite outwardly extending median tongue 41 of said lamination is folded upward against the outer face of coil C², thereby to lock or anchor the laminations in place and to maintain the coils rigidly affixed upon the horseshoe magnet.

Where it is attempted to wind the field coil directly upon the magnet, it is not practical to form it symmetrically in layers with interposed layer insulation and winding the coils results in lack of uniformity with respect to insulation and magnetic effect, with the likelihood of turns being shorted with consequent heating of the motor and impairment of its performance.

By the arrangement of the present invention, there is eliminated the cost and annoyance of winding the coils about the magnet in situ, since the prewound coils can be produced with uniform insulation and can be tested before application to the magnet. The pre-wound coils being layer wound and layer insulated are readily applied and there is little or no extra loss of magnetic flux due to the larger core or inner coil diameter incurred in the mode of assembly set forth.

Preferably the leads 35 from the respective coil elements are covered with insulation 42 and extend along the length of the magnet legs to the circuit interrupter. These leads are preferably clamped against the legs of the horseshoe magnet by clips 43 encompassing said leads and anchored to the legs of the horseshoe magnet by the heads of the same bolts 32 which maintain said magnet in place upon the base frame.

The field circuit interrupter comprises a fixed contact 44 mounted at the end of a curved arm 45 affixed as by screws 46 to the lower part of the standard 16 and having a tip 47 to which the extremity of one of the leads 35 is soldered. The other lead 36 is affixed as by soldering to a contact stud 48 with a knurled end (similar to that shown in Fig. 5) and embedded in to the standard 16.

The movable circuit interrupter contact 49 is affixed to the end of a metal interrupter arm 50 of channel bar conformation having a rectangular base 51 and upstanding side walls 52 rising therefrom and desirably progressively widening, as shown from the outer or contact carrying end to the opposite or bearing end. Riveted between the side walls and against the base of the channel arm is a leaf spring 53 having a hairpin turn bight 54 which normally extends somewhat past aligned circular bearing apertures 55 near the wider end of said side walls. The bearing for said arm is a stud 56, the root of which is embedded at its knurled end 57 into the standard 16. Stud 56 is of diameter to afford a bearing fit for apertures 55, and, as shown in Fig. 5, its free end preferably extends beyond the outer side wall 52 of the arm 50. The stud 56 has a peripheral groove 58 thereabout of length equal to the width of the spring 53. The end of the outer leg of spring 53 which is curved at 59 may snap into a peripheral groove in the stud 48, which corresponds to groove 58. When thus retained by stud 48, the bight 54 of spring 53 enters into the peripheral groove 58 of stud 56, thereby securely assembling the interrupter arm in position, upon its bearing stud 56, to be resiliently held by stressed spring 53 with the contact 49 against contact 44. When the legs of the spring are pressed together, the bight 54 will be deflected outward to clear the apertures 55 and the arm can then readily be drawn off the stud 56.

Preferably, an insulating wear piece 60 is affixed to the lower or outer face of the base 51 of the circuit interrupter arm, and it is preferably so affixed by the same rivets 61 and 62 which anchor the leg of spring 53 against the inner face of said arm. The wear piece is engaged by an appropriate cam 64 formed integrally on the outer or protruding end of the axle 19.

As shown in the drawings, the inner walls of the horseshoe magnet legs diverge at 65 from the cross bar to the pole pieces so as to clear the side walls of the inner standard 15 at their pole piece ends, and there is sufficient space left between the coil and said standard for the accommodation of a condenser 66, the leads 67 of which are soldered to the respective leads 35 and 36, thereby to bridge across the circuit interrupter contacts 44, 49 to minimize arcing.

It will be understood that in use the frame 10 is affixed at its eyes 11, 12 and 13 to the body of the massaging implement, brush or the like, and the unbalanced armature A will vibrate the motor and with it the implement. As above indicated, the extent of vibration may be varied depending upon the degree of mechanical unbalance in the armature, and is further accentuated in operation by the magnetic unbalance due to the larger end of armature getting a greater pull than the small end.

In use it will be apparent that the field coil when connected to the outlet box by leads 33 and 34 is energized whenever the interrupter contacts 44 and 49 are closed, the circuit passing from coil C' to lead 35, arm 45, contact 44, arm 50, spring 53 and the other lead 36 through coil C² to the other terminal. In this operation the armature will be swung around for its diameter to bridge across the gap between the pole pieces and in such operation the circuit will be broken by the cam 64 moving contact 49 to open position. By means of its inertia, the heavy armature will move sufficiently past center position, so that upon the subsequent closure of the interrupter contact 49, the operation set forth will be repeated with the armature displaced by 180 degrees.

The speed of the motor may be varied by timing the making and breaking in relation to the position of the armature to the field poles and also to the spacing of the contact points. If the period of contact is short, the armature receives only a light impulse and the intensity of the impulse will increase with increase in the period of contact.

Contact arm 50 can readily be removed for replacement by simply pushing the spring 53 off the stud 48 toward arm 50 in which operation the bight 54 will clear the stud 56 and its peripheral groove 58, so that the arm can be pulled off said stud and it or a replacement arm can as readily be restored.

While the motor has been particularly designed for vibrator use, it will be understood that a plain symmetrical armature could be used for application of the motor to more general use, where vibration is not desired, as for instance, for driving electric shavers and the like.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A small electric motor, comprising an insulating frame having unitary upstanding standards, an armature removably affixed between said standards, an axle therefor, bearing in said standards, one end of said axle having a cam formation, a field having a field coil, a circuit interrupter having a movable contact, a contact carrying arm therefor of channel formation and under the influence of said cam, a bearing stud in one of the standards and extending through the sides of said channel frame, a reversely turned leaf spring anchored at one leg to the base of said channel, means fixed on said standard and engaged by the free end of said reversely turned spring, and a peripheral groove in said bearing stud accommodating the bight of said leaf spring.

2. In a small electric motor, a unitary insulating frame having a base plate with mounting lugs and standards rising from said plate, an armature between said standards, an axle through said armature to which the latter is affixed and bearing in said standards, one end of said axle having a cam, a field coil, a circuit interrupter therefor, said circuit interrupter including an arm rigidly affixed to said standard with a contact at one end thereof and a coacting arm pivoted to said standard and under the influence of said cam and having a contact registering with said fixed contact, said arm being of channel shape, a leaf spring with a hairpin turn and having one leg rigidly affixed within said channel, a stud affixed in said standard, the sides of said channel arm having apertures about said stud, the bight of said spring normally extending across said apertures, said stud having a peripheral groove yieldingly accommodating said bight to position the arm, and a second stud on said standard and accommodating the free end of said spring and maintaining the same under contact closing tension.

3. The combination recited in claim 2, in which an insulating wear piece is at the exterior of the base of the channel arm and is engaged by the cam and in which a pair of rivets engage the wear piece and the spring leg to clamp said elements against opposite faces of the channel arm base.

4. A vibratory electric motor comprising an insulating frame having spaced upstanding standards, an armature of magnetic material between said standards, said armature being a segment of a cylinder having the appearance in plan of an isosceles trapezoid with arcuate bases, an axle therefor bearing in said standards, and a set screw transversely of the armature clamping the same upon said axle.

5. In a vibratory electric motor, a laminated armature comprising a cylinder with opposed segments removed along chords of equal length, inclined with respect to each other, so that in plan the armature has the appearance of an isosceles trapezoid with arcuate bases of unequal length, said armature having apertures therethrough parallel to the axis thereof, and rivets through said apertures holding the laminations thereof together.

6. The combination recited in claim 5, in which said apertures are of unequal diameter, the larger of said apertures being near the shorter arcuate base and having a hollow rivet therethrough, the smaller of said apertures being near the longer arcuate base and having a solid metal rivet therethrough.

7. As an article of manufacture, the field structure of an electric motor, said structure comprising a laminated horseshoe magnet having a cross bar and legs with pole pieces, prefabricated field coils on the cross bar of said magnet, said field coils each having a mandrel bore of width sufficiently larger than those of the armature legs and cross bar to facilitate introduction thereof over the legs for positioning about the cross bar, and means extending into the gap between the coils and the cross bar of the magnet for rigidly affixing the coils with respect to said cross bar.

8. As an article of manufacture, a field structure for a small electric motor, said structure comprising a laminated horseshoe magnet having a cross bar and legs with pole pieces, prefabricated field coils on said cross bar, said field coils each having a mandrel bore of width sufficiently larger than those of the armature legs and cross bar to facilitate introduction thereof over the legs for positioning about the cross bar, and means extending into the gap between the coils and the cross bar for rigidly affixing the coils with respect to said cross bar, said means being of magnetizable material and conjointly with the cross bar substantially filling the mandrel opening of the coils.

9. As an article of manufacture, a field structure for a small electric motor, said structure comprising a laminated horseshoe magnet having a cross bar and legs with pole pieces, prefabricated field coils on said cross bar, said field coils each having a mandrel bore of width sufficiently larger than those of the armature legs to facilitate introduction thereof over the legs for positioning about the cross bar, and means extending into the gap between the coils and the cross bar of the magnet for rigidly affixing the coils with respect to said cross bar, said means comprising a stack of laminations of magnetizable metal of thickness conjointly with that of the magnet cross bar to fill the mandrel opening of the coils, the outer of said laminations being of length greater than the companion laminations and being bent over the latter at opposite ends to retain the latter against relative slipping, said longer lamination also having out-turned end tongues, one for abutment against the end face of one of the coils and the other when turned outward abutting the opposite end face of the other coil and thereby maintaining the parts in assembled relation.

10. The method of fabricating a field structure for a small electric motor of the type comprising a horseshoe magnet and a field coil about the cross bar thereof; which consists in prewinding the field coils in two sections on mandrels of width sufficiently larger than those of the magnet legs and cross bar to permit introduction of the prefabricated coils thereover and about the cross bar, and after so positioning the coils, introducing into the space between the horseshoe magnet and the coil, magnetic material to fill the gap and anchoring said magnetic material in place.

11. A circuit interrupter, comprising a base, a pair of coacting contacts mounted on said base, an arm pivoted to said base and carrying one of said contacts, the pivot comprising a bearing stud extending outward from said base, the contact carrying arm being of channel formation and having apertures at the bearing end embracing said stud, a reversely turned spring anchored at one leg to the base of said channel formation, means on said base arresting the free end of said spring, said bearing stud having groove means for accommodating the bight of said leaf spring for anchoring the contact carrying arm about the bearing stud.

12. The combination recited in claim 11, in which the groove means on said bearing stud comprises a peripheral groove of length to accommodate the width of the spring, in which said spring is a leaf spring and in which the means on said base arresting the free end of said leaf spring is a second stud in said base.

JOHN A. HANLEY.

REFERENCES CITED

The following references are of record in the file of this patent:

UNITED STATES PATENTS

| Number | Name | Date |
| --- | --- | --- |
| 1,760,591 | Forbes | May 27, 1930 |
| 2,183,549 | Dalkowitz | Dec. 19, 1939 |
| 2,287,501 | Thomas | June 23, 1942 |
| 2,350,817 | Purves et al. | June 6, 1944 |